US011263696B2

(12) United States Patent
Jaffery et al.

(10) Patent No.: US 11,263,696 B2
(45) Date of Patent: Mar. 1, 2022

(54) SYSTEM AND METHOD FOR SCREENING ENTITIES USING MULTI-LEVEL RULES AND FINANCIAL INFORMATION

(71) Applicants: Hasnain Sajjad Jaffery, San Jose, CA (US); Ahmad Ali Khan, Toronto (CA)

(72) Inventors: Hasnain Sajjad Jaffery, San Jose, CA (US); Ahmad Ali Khan, Toronto (CA)

(*) Notice: Subject to any disclaimer, the term of this patent is extended or adjusted under 35 U.S.C. 154(b) by 0 days.

(21) Appl. No.: 16/533,652

(22) Filed: Aug. 6, 2019

(65) Prior Publication Data

US 2021/0012424 A1 Jan. 14, 2021

Related U.S. Application Data

(60) Provisional application No. 62/872,579, filed on Jul. 10, 2019.

(51) Int. Cl.
*G06Q 40/06* (2012.01)
(52) U.S. Cl.
CPC .................... *G06Q 40/06* (2013.01)
(58) Field of Classification Search
CPC ...................................................... G06Q 40/06
See application file for complete search history.

(56) References Cited

U.S. PATENT DOCUMENTS

| 7,856,388 | B1 * | 12/2010 | Srivastava | G06Q 40/00 705/36 R |
| 10,262,371 | B2 * | 4/2019 | Donia | G06Q 30/0279 |
| 2002/0077949 | A1 * | 6/2002 | Qasem | G06Q 40/02 705/36 R |

(Continued)

OTHER PUBLICATIONS

N. N. N. M. Hassan, R. M. Shafi and S. Mohamed, "The determinants of capital structure: Evaluation between Shariah-compliant and conventional companies," 2012 International Conference on Innovation Management and Technology Research, 2012, pp. 205-209, doi: 10.1109/ICIMTR.2012.6236389. (Year: 2012).*

(Continued)

*Primary Examiner* — Bruce I Ebersman
*Assistant Examiner* — Steven R Chism
(74) *Attorney, Agent, or Firm* — Seed IP Law Group, LLP

(57) ABSTRACT

Screening of entities using multi-level rules and tolerances against entity data. The entity data are screened for multiple entities, including determining if the entity data comply with business activity rules. If a respective entity fails to comply with the business activity rules, investments with the non-compliant entity are added to a list of non-usable investments. If the respective entity complies with the business activity rules, the respective entity is identified as a business-activity-compliant entity. Each respective business-activity-compliant entity is then screened using multiple screening methodologies, which are applied to screen the entity data for the respective business-activity-compliant entity against each of the financial rules in accordance with the respective screening methodology. If the financial rules satisfy at least one tolerance setting, investments with the respective business-activity-compliant entity are added to a list of usable investments; otherwise, investments with the respective business-activity-compliant entity are added to the list of non-usable investments.

18 Claims, 4 Drawing Sheets

(56) References Cited

U.S. PATENT DOCUMENTS

| | | | |
|---|---|---|---|
| 2004/0107152 A1* | 6/2004 | Marlowe-Noren | G06Q 40/02 705/35 |
| 2006/0100897 A1 | 5/2006 | Halloran, Jr. et al. | |
| 2007/0038551 A1* | 2/2007 | Shah | G06Q 40/06 705/37 |
| 2007/0130060 A1 | 6/2007 | Ariarajah et al. | |
| 2007/0174102 A1 | 7/2007 | Coulter | |
| 2007/0271195 A1* | 11/2007 | Wollin | G06Q 40/02 705/36 R |
| 2009/0006267 A1* | 1/2009 | Fergusson | G06Q 40/06 705/36 R |
| 2010/0030718 A1* | 2/2010 | Anderson | G06F 21/6218 706/47 |
| 2012/0296845 A1 | 11/2012 | Andrews et al. | |
| 2013/0179259 A1* | 7/2013 | Lindauer | G06Q 30/02 705/14.52 |
| 2013/0304670 A1* | 11/2013 | Hammers | G06Q 40/06 705/36 R |
| 2015/0324919 A1 | 11/2015 | Riggs et al. | |

OTHER PUBLICATIONS

PCT/US2019/045307—International Search Report and Written Opinion, dated Apr. 8, 2020, 12 pages.

* cited by examiner ns, consuming alcohol or other foods, using tobacco products, etc. These prohibitions can extend to investments and ownership interests in businesses that sell goods or services substantially related to the prohibited good or activity. For example, if a member is prohibited from consuming alcohol, the member is also prohibited from investing in a company that makes, sells, or distributes alcohol. In these situations, restricted members have to become aware of a business's activities prior to making investments in the business. It is with respect to these and other considerations that the embodiments described herein have been made.
SYSTEM AND METHOD FOR SCREENING ENTITIES USING MULTI-LEVEL RULES AND FINANCIAL INFORMATION

BACKGROUND

Technical Field

The present disclosure relates generally to the screening of investments using multi-level rules and tolerances against business activities and financial information.

Description of the Related Art

Some religions and other groups prohibit their members from owning specific goods or partaking in or being involved with select activities or organizations. For example, some religions prohibit their members from participating in gambling, collecting financial interest payments, consuming alcohol or other foods, using tobacco products, etc. These prohibitions can extend to investments and ownership interests in businesses that sell goods or services substantially related to the prohibited good or activity. For example, if a member is prohibited from consuming alcohol, the member is also prohibited from investing in a company that makes, sells, or distributes alcohol. In these situations, restricted members have to become aware of a business's activities prior to making investments in the business. It is with respect to these and other considerations that the embodiments described herein have been made.

BRIEF SUMMARY

Techniques are described herein for the screening of entities using multi-level rules and tolerances against business activities and financial information, collectively entity data, for investment purposes. The entity data is screened for each respective entity. This screening includes determining if the entity data for the respective entity complies with one or more business activity rules. In response to a respective entity failing to comply with the business activity rules, investments associated with the non-compliant entity are added to a first list of non-usable investments. In response to the respective entity complying with the business activity rules, the respective entity is identified as a business-activity-compliant entity. Each respective business-activity-compliant entity is then screened using multiple methodologies. A plurality of screening methodologies are defined to apply to the entity data, including applying one or more financial rules to the entity data for the respective business-activity-compliant entity in accordance with the respective screening methodology. In response to the applied financial rules being satisfied, investments associated with the respective business-activity-compliant entity are added to a second list of usable investments. And in response to the entity data failing to satisfy the applied financial rules, at least one tolerance setting is applied to the financial rules. It is then determined if the entity data satisfies the applied financial rules based on the tolerance setting. In response to the applied financial rules satisfying the at least one tolerance setting, investments associated with the respective business-activity-compliant entity are added to the second list of usable investments. And in response to the applied financial rules failing to satisfy the at least one tolerance setting, the investments associated with the respective business-activity-compliant entity are added to the first list of non-usable investments. The second list of usable investments is then provided to a user once approved by the Board.

In some embodiments, adding an investment of a respective business-activity-compliant entity to the first list of non-usable investments in response to the applied financial rules failing to be satisfied, includes: receiving instructions to modify the at least one tolerance setting for the plurality of financial rules; re-employing each respective screening methodology of the plurality of screening methodologies. The re-employment of the screening methodologies includes: applying each of the financial rules to the entity data for the respective business-activity-compliant entity in accordance with the respective screening methodology; determining if the applied financial rules satisfy the at least one modified tolerance setting; and in response to the applied financial rules satisfying the at least one modified tolerance setting, adding the investment of the respective business-activity-compliant entity to the second list of usable entities.

In other embodiments, adding an investment of a respective business-activity-compliant entity to the first list of non-usable investments in response to the applied financial rules failing to be satisfied, includes: receiving instructions from a review board indicating the respective business-activity-compliant entity is compliant and its investments usable by restricted members; and adding the investments to the second list of usable investments.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present disclosure, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

As used herein, the term "restricted member" refers to a person under control of, bound to, or follow rules or restrictions established by a group of people.

As used herein, the term "investment" refers to an interest in an entity that is owned by a person or other entity. Investments may include, but are not limited to, stocks, bonds, real estate, mutual funds, securities, equities, or other financial interests.

As used herein, the term "entity" refers to a company or business organization that sells, donates, distributes, or otherwise transfers investments in the entity to a person or other entity.

Figure 1:
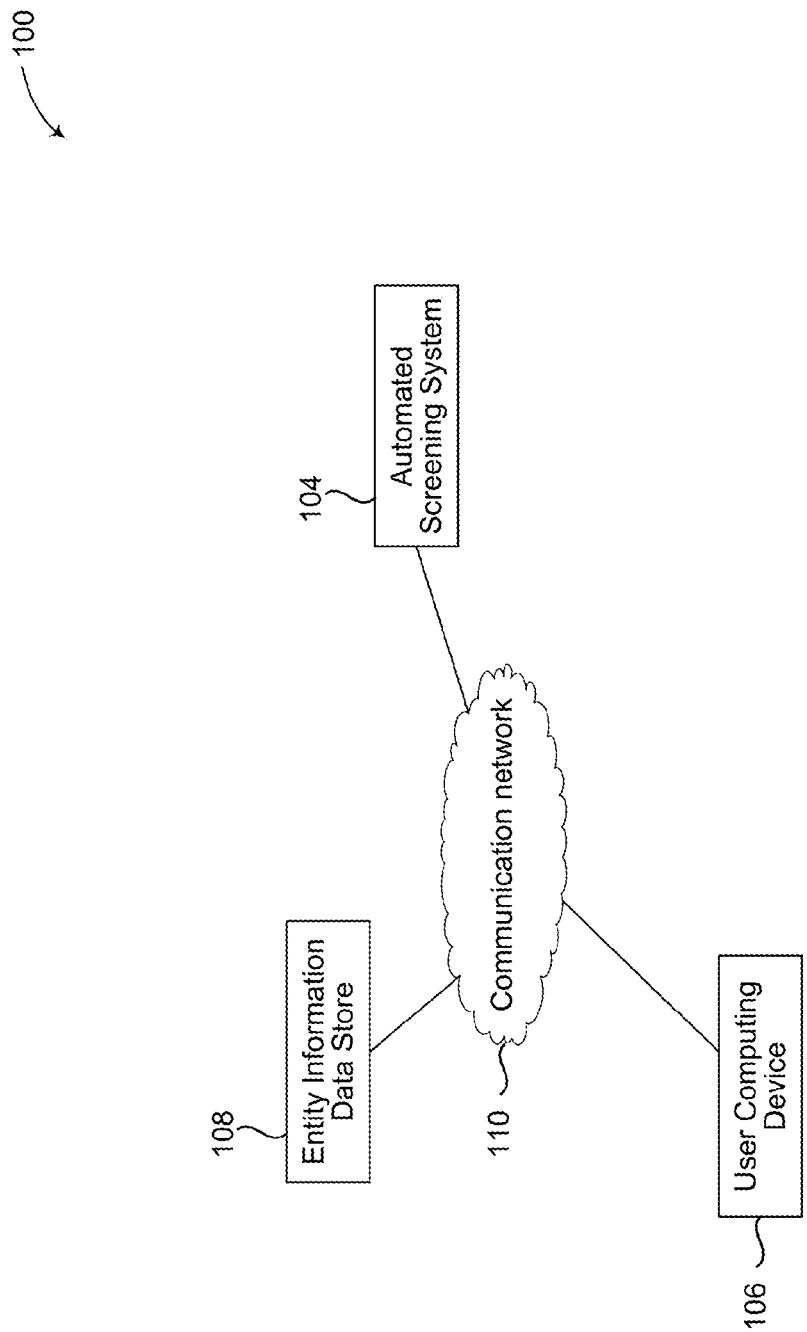
FIG. 1 illustrates a context diagram of an environment that implements the automated screening of entities in accordance with embodiments described herein.

FIG. 1 illustrates a context diagram of an environment that implements an automated screening of entities in accordance with embodiments described herein. System 100 includes an automated screening system 104, a user computing device 106, and an entity information data store 108.

The user computing device 106 is a personal computer, laptop computer, desktop computer, or other computing device used by a user to access the automated screening system 104, such as if the automated screening system 104 is employed as a remote server computer or with cloud computing resources. In some embodiments, the automated screening system 104 may be accessed directly by a user and the user computing device 106 may not be included. In other embodiments, the user computing device 106 may employ the functionality of the automated screening system 104.

The automated screening system 104 is a computing system that utilizes various types of business-related activity information and financial data for each of a plurality of entities to determine if investments associated with the entities are usable by restricted members of a group that prohibits investments in entities that are involved with prohibited goods or services. The business-related activity information for an entity identifies or describes the business activities of the entity, such as listed on the entity's website or regulatory category. The financial data includes various different types of information related to the finances of the entity, including balance sheets, income statements, other comprehensive income, etc.

The automated screening system 104 also receives, or is programmed with, one or more business activity rules, one or more financial rules, a plurality of screening methodologies, and one or more tolerances. The business activity rules and financial rules are rules used to identify entities that make, sell, distribute, or are otherwise involved with goods or services banned to restricted members. Financial rules can also include rules dealing with performance of investments without regard to banned or restricted goods or services. The screening methodologies are processes or procedures for reviewing or analyzing entity data with respect to the business activity rules and the financial rules.

The business-related activity information (and in some embodiments, the financial data) for an entity is screened against the business activity rules to determine if the entity is compliant with restrictions imposed on restricted members. If an entity is compliant with the business activity rules, then the financial data for that entity is then screened against the financial rules in accordance with screening methodologies. If an entity is compliant with the financial rules, given one or more tolerances, then investments associated with the entity are usable by the restricted members. Usable investments are those investments that can be purchased by, possessed by, transferred, or otherwise owned by restricted members.

The operation of certain aspects of the disclosure will now be described with respect to FIGS. 2A-2B. In at least one of various embodiments, process 200 described in conjunction with FIGS. 2A-2B, may be implemented by or executed on one or more computing devices, such as automated screening system 104 or user computing device 106.

Figure 2A:
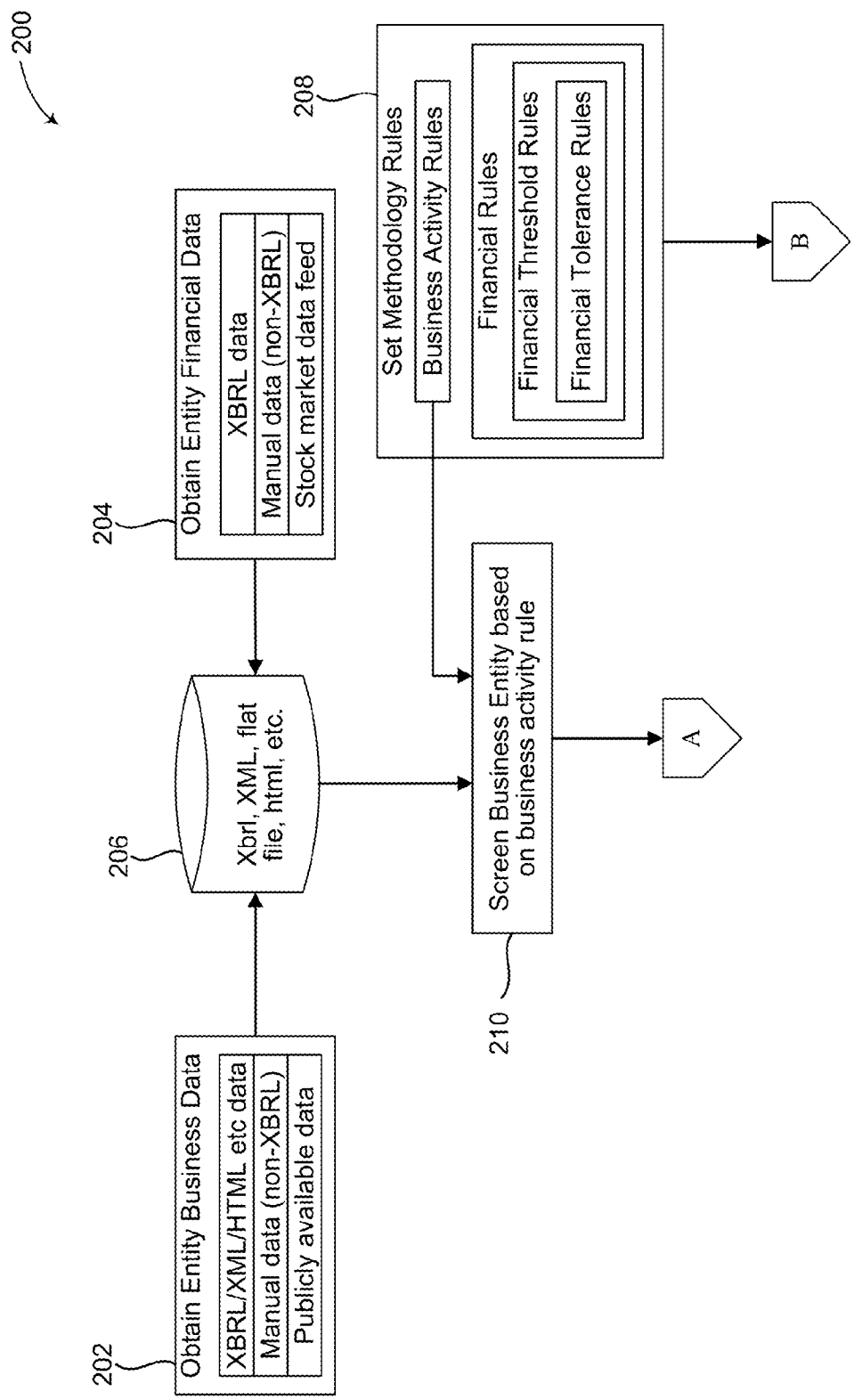
FIGS. 2A-2B illustrate a logical flow diagram generally showing one embodiment of a process for screening entities using business activity rules followed by financial rules in accordance with embodiments described herein.
Figure 2B:
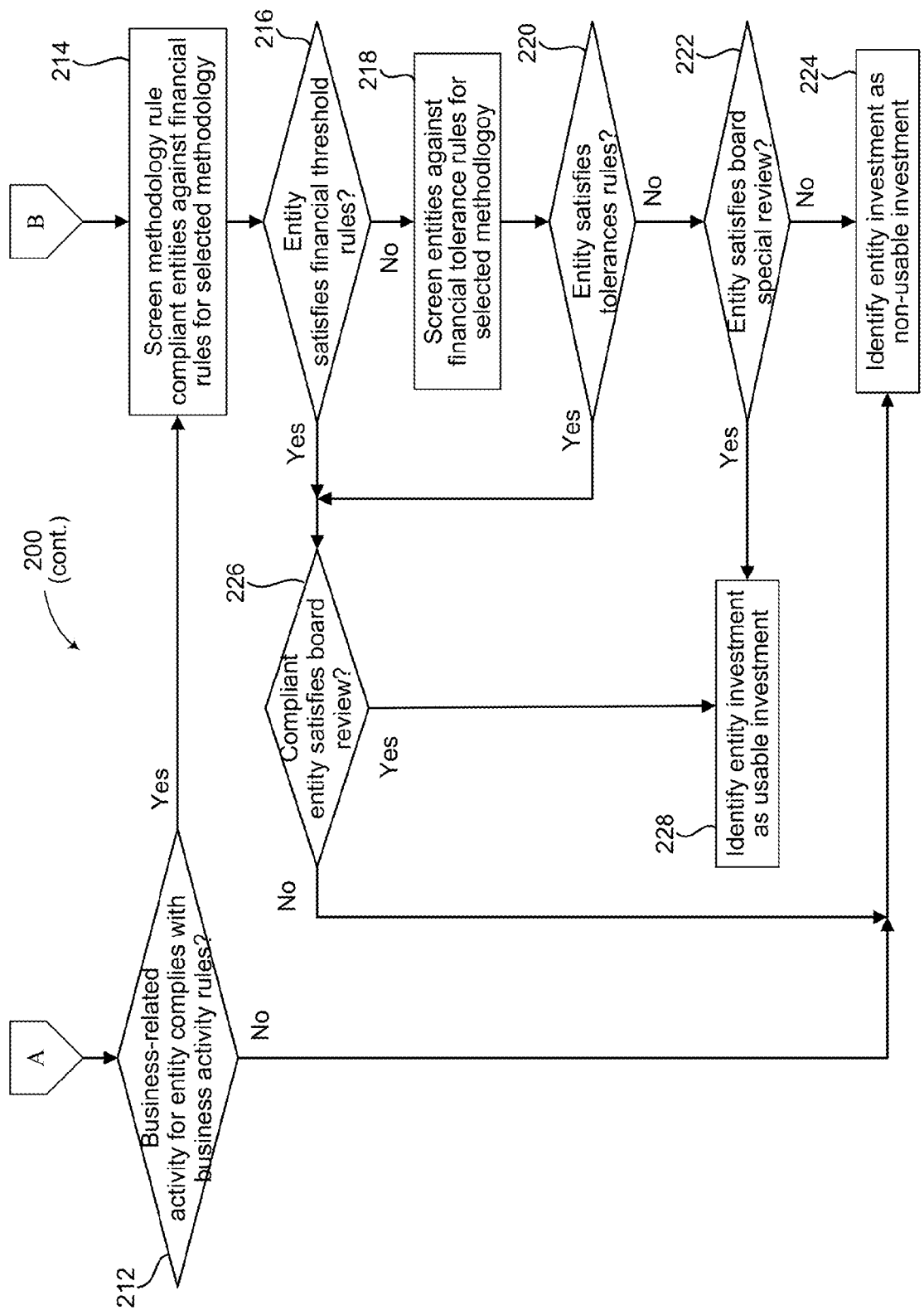

FIGS. 2A-2B illustrate a logical flow diagram generally showing one embodiment of a process 200 for screening entities using financial rules, business activity rules, and tolerances in accordance with embodiments described herein. Process 200 begins at blocks 202 and 204 in FIG. 2A.

At block 202, entity business data is obtained for one or more entities. In some embodiments, the entity business data may be referred to as business-related activity information. In various embodiments, the entity business data includes information regarding the business, whether published by the entity or provided by another entity or system. For example, if the entity is Company_XYZ, then the entity business data includes information published by Company_XYZ indicating what types of goods or services Company_XYZ sells or provides. In some embodiments, the entity business data also includes entity objectives. The entity objectives or line-of-business information may be obtained by a user manually entering the information into the system or received from other data sources, such as publicly available data. For example, the system may obtain the entity objectives from the entity's website, annual financial reports, etc.

Entity business data can be obtained from an entity website, entity mission statement, regulatory goods or service categories, or other available goods- or service-related information. Entity business data may be in various different forms or formats, including: XBRL (eXtensible Business Reporting Language) data, XML data, HTML data, manual data or non-XBRL data, publicly available data, or other data regarding the business of the entity.

At block 204, entity financial data is obtained for each of the one or more entities. The entity financial data may include stock market data, XBRL data, manual (non-XBRL) data, or other third party financial data. If the data is received in a non-XBRL format, then it may be converted into electronic data format for processing. The XBRL data may be provided by a government regulatory, such as the U.S. Securities and Exchange Commission. The manual data & data acquired/received via third party data provider, which may be in XBRL format or not, includes balance sheet, income statement, other comprehensive income statements, etc.

The entity business data and the entity financial data obtained at blocks 202 and 204, respectively, may, at block 206, be stored in one or more databases, such as entity information data store 108 in FIG. 1. If information for a new entity not previously stored in the database is received, then the new entity is added to the database. If the information updates a previous entity, then the previous entity information in the database is updated. The data may be stored in one or more different formats depending on how it is received. For example, the data may be stored in XBRL formal, XML format, flat file format, HTML format, or other data storage formats.

Prior to screening the business entity at block 210, one or more technique or methodology rules (collectively referred to as methodology rules or screening methodologies) are set at block 208. The methodology rules define how to screen entities. Each methodology has multi-level rules describing different procedures on how the entity business data or entity financial data is analyzed, what data can be analyzed, how related the data is to an entity (e.g., whether a subsidiary's data can be analyzed for the parent company), etc. The screening methodologies may differ from one another depending on various factors associated with where a restricted member is located, including, but not limited to, local cultures or customs, government regulations, market needs, traditions or schools of thought, etc.

Each of the methodology rules includes one or more business activity rules and one or more financial rules. In various embodiments, the business activity rules or the financial rules, or both, may be set by an administrator, a governing body, a regulatory body, a user, or other entity that intends to limit or restrict which entities are compliant and its investments are usable by a restricted member based on the activities or philosophy of the entity.

The business activity rules identify goods or services that an entity cannot be involved with for a restricted member to invest with an entity. Non-limiting examples of business activity rules may include, but are not limited to, entity cannot make, sell, or distribute alcohol; entity cannot provide conventional banking and interest; entity cannot sell or promote insurance; entity cannot sell, distribute, or promote tobacco products; entity cannot be involved with gambling or allow people to gamble; etc.

The financial rules are similar to the business activity rules in that they identify goods or services that an entity cannot be involved with for a restricted member to own an investment in that entity. However, unlike the business activity rules, which are based on mission statements or regulatory categorization, the financial rules look at how the entity's money is used and where the money is going and where it is coming from (e.g. interest, etc.), which may not show up in an entity mission statement. In various embodiments, the financial activity rules include multiple financial threshold rules. These financial threshold rules define financial ratios with respective thresholds (e.g., a maximum acceptable ratio limit). In some embodiments, the financial threshold rules may also define a maximum acceptable value, maximum acceptable amount, or other metrics to analyze the entity financial data.

For example, an entity may identify and describe itself as a technology company. But the entity may have a division researching and developing electronic cigarettes. If only the entity business data for the entity was reviewed before investing in the entity, then the person may unwillingly be breaking the rules associated with investing in an entity involved with the selling of tobacco products. The financial data, however, provides this additional information. Non-limiting examples, of financial rules may include, but are not limited to, entity cannot invest in another entity having a business-related activity prohibited by the business activity rules; entity cannot collect interest payments; entity cannot receive profits over a select amount from prohibited entities; etc.

One or more of the financial rules may also include one or more financial tolerance rules. The tolerance rules indicate different acceptable levels of financial data values with respect to the financial threshold rules when the financial threshold rules are not met (e.g., a financial ratio fails to comply with threshold limit). For example, if one of the financial threshold rules indicates that the entity can invest up to 5%, then a tolerance level may be set to a select percentage (e.g., less than 7%) of the entity's total investment. If the entity fails to comply, then based on the tolerance level set (if and only if) then this debt percentage is checked again, which can indicate an acceptable level of investment.

In some embodiments, the financial threshold rules and tolerances may be used for conventional investment screening based on various financial factors, such as past performance, fees, management stability, class of asset, etc. In this instance, the financial threshold rules may include restrictions on entity performance, investment performance, or some combination thereof. Accordingly, the financial threshold rules may be based on prohibited goods or services, conventional investment strategies, or any combination thereof.

At block 210, the entity business data of each of the one or more entities, as received at block 202, are screened against the one or more business activity rules for one or more methodology rules, as set at block 208. Entity data is screened for acceptability based on the nature or type of business where the entity is involved. The nature of business that is defined in the publicly available document submitted by the entity to a respective government or financial group or agency.

In various embodiments, this screening is done by comparing the entity business data of an entity with each of the business activity rules to determine if the entity sells or provides goods or services banned by the business activity rules. This comparison is done for each entity with the business activity rules. Such rule consideration may be based on the business objective/line of business information available in company's annual financial report (e.g. 10K etc.) and other publicly available data.

Process 200 continues at decision block 212 in FIG. 2B, where a determination is made whether the business-related activities for an entity comply with each of the one or more business activity rules for the one or more methodology rules utilized. An entity complies with each of the business activity rules when the associated entity business data does not match any of the business activity rules. Although the business activity rules are described with respect to banned goods or services, embodiments are not so limited. In other embodiments, the business activity rules may identify the allowed or acceptable goods or services offered by an entity. In at least one such embodiment, an activity-compliant entity is one that matches at least one of the business activity rules.

If an entity complies with the business activity rules, then process 200 flows to block 214 for each of those activity-compliant entities; otherwise, process 200 flows to block 224 for each non-compliant entities.

At block 214, the activity-compliant entities are screened against the one or more financial rules in accordance with one or more screening methodology, as set at block 208. In various embodiments, financial threshold rules for the one or more financial rules are selected and applied to the entity financial data. These financial threshold rules are based on the threshold levels (e.g., maximum acceptable limits) defined by the system for one or more different ratio calculations to be performed. In some embodiments, the financial threshold rules may also be maximum values applied without the utilization of ratios.

In various embodiments, one activity-compliant entity is selected. Next, the entity financial data for the selected entity, as received at block 204, is screened against the financial threshold rules, as set at block 208, in accordance with the one or more selected screening methodologies. In various embodiments, this screening is done by generating one or more ratios from the entity financial data of the selected entity in accordance with each of the financial threshold rules based on the selected screening methodology. These ratios are then compared with the actual threshold values in the financial threshold rules to determine if the entity financial data is within the financial threshold rules for selling, providing, investing, or otherwise associated with goods or services banned by the business activity rules (or conventional investment strategies or some combination thereof).

Process 200 continues at decision block 216, where a determination is made whether one or more of the activity-compliant entities satisfy the financial threshold rules. In some embodiments, an entity complies with the financial threshold rules when the associated financial data meets the ratio thresholds defined by each financial threshold rule. Although the financial threshold rules are described with respect to financial information for banned goods or services, embodiments are not so limited. In other embodiments, the financial threshold rules may identify the allowed or acceptable financial information for goods or services offered by an entity. In at least one such embodiment, a financial-compliant entity is one that matches at least one of the ratio thresholds defined by one financial threshold rule or all financial threshold rules, depending on the selected methodology.

If an activity-compliant entity also complies with the financial threshold rules, then process 200 flows to decision block 226 for each of those financial-compliant entities; otherwise, process 200 flows to block 218.

At block 218, each non-financial-compliant entity is screened in accordance with the financial tolerance rules for the financial thresholds of the selected methodology, if applicable or available for the selected financial threshold rules or selected methodology. In various embodiments, the entity financial data for a non-financial-compliant entity is again screened against the financial threshold rules in accordance with the selected screening methodology using one or more tolerances, as set in block 208.

In at least one embodiment, this screening is done by comparing the entity financial data of the entity with each of the financial threshold rules (e.g., comparing a ratio defined by the financial threshold rules with a corresponding threshold value), where the financial threshold rules are adjusted or screened within the set tolerances. For example, if one of the financial threshold rules indicates that the entity cannot invest in another entity having a business-related activity prohibited by the business activity rules and the entity does not satisfy this financial threshold rule, then the tolerance level (e.g., a select percentage of the entity's total investment strategy or a select dollar amount) is applied to see if the entity satisfies the financial threshold rule within the financial tolerance rule. In some embodiments, the system may include a plurality of different tolerances, such that the system analyzes the entities at different tolerance levels. In various embodiments, the financial tolerance rules are defined by an administrator or board review.

Process 200 continues at decision block 220, where a determination is made whether one or more of the non-financial-compliant entities satisfy the financial threshold rules based on the financial tolerance rules. In some embodiments, an entity complies with each of the plurality of financial threshold rules when the associated financial data meets the tolerance levels for each financial threshold rule. For example, if an entity sells $2.6 million worth of banned goods, and the financial threshold rules indicate that an entity cannot sell more than $2.5 million worth of banned goods, then the entity is not compliant with the financial threshold rules (e.g., as determined at decision block 216). But if the financial tolerance rules indicates that there is a 5% tolerance buffer or margin of acceptance, then the entity, in this example, complies with the financial tolerance rules for that financial threshold rule.

If a non-financial-compliant entity satisfies the financial tolerance rules, then process 200 flows to decision block 226 for each of those financial-tolerance-compliant entities; otherwise, process 200 flows to decision block 222 for each non-compliant entity.

At decision block 222, a determination is made whether the non-compliant entities satisfy a special approval board review. In some embodiments, an advisory board may review the non-compliant entity, such as if a special consideration or request from the entity exists. The board may provide input indicating whether a non-compliant entity is indeed compliant or if it should remain non-compliant. In some embodiments, the board may determine that an entity is deemed compliant despite the non-compliant status. In other embodiments, the board may indicate one or more new, different, or modified tolerances. In various embodiments, a user may input such modified tolerances. If new or modified tolerances are provided, then process 200 loops to block 218 to re-screen the non-compliant entities based on the new or modified tolerances. In some other embodiments, the board may recommend business changes to the entity before the entity is deemed compliant. In at least one embodiment, the board review may be automatically performed by the system based on user or administrator settings.

If an entity remains non-compliant, process 200 flows to block 224; otherwise, process 200 flows to block 228 for each board-compliant entity. In some embodiments, decision block 222 may be optional and may not be performed and process 200 flows to block 224 for the non-compliant entities.

If there are compliant entities from decision block 216 or decision block 220, then process 200 flows to decision block 226. At decision block 226, a determination is made whether the compliant entities satisfy a board review. In some embodiments, an advisory board may review the compliant entities as a final approval step to determine whether a compliant entity can remain compliant or if it should be non-compliant. If an entity remains compliant, process 200 flows to block 228; otherwise, process 200 flows to block 224 for each board-non-compliant entity. In at least one embodiment, the board review may be automatically performed by the system based on user or administrator settings.

If there are compliant entities from decision block 226 or decision block 222, then process 200 flows to block 228. At block 228, one or more investments associated with each compliant entity are identified as being a usable investment. In at least one embodiment, the usable investments are added to a list of usable investments. Based on the foregoing process, these usable investments are investments associated with those entities where (1) the entity performs business-related activities that comply with a plurality of business activity rules and (2)(a) the financial data for the entity (or investment) satisfies financial rules (whether directly or via set tolerance levels in accordance with a different screening methodologies or (2)(b) an advisory board deems the entity compliant and its investments usable. In various embodiments, the list of usable investments is presented to a user, such as via a display device.

If there are non-compliant entities from decision block 212 or decision block 222, then process 200 flows to block 224. At block 224, one or more investments associated with the non-compliant entities are identified as non-usable investments. In some embodiments, the non-usable investments are added to a list of non-usable investments. The non-usable investments are investments associated with those entities involved, in some way as determined by process 200, with prohibited goods or services. In some embodiments, the non-compliant entity may itself be identified as non-investable by users.

Once the above-described screening is complete for a selected methodology, a second screening methodology is selected and the financial data for the selected entity is then screened in accordance with the second screening methodology. In various embodiments, the screening of different methodologies may be performed in parallel, sequentially, or some combination thereof. For example, two screening methodologies may be related or based on one another such that they are performed sequentially. Yet another screening methodology may be performed in parallel with the other methodologies.

This process of the entity financial data for one or more activity-compliant entities may continue until each of a plurality of screening methodologies is applied for the entity. In some embodiments, the screening of an entity may terminate if the financial data for that entity is non-compliant under any of the screening methodologies. In other embodiments, the screening of an entity may continue for multiple screening methodologies. In this way, the results from each screening methodology can be provided to a user.

Similarly, after the screening process is complete for a selected entity, a second activity-compliant entity is selected and the financial data for the second selected entity is then screened in accordance with the screening methodologies, as described above. In various embodiments, the screening of different entities may be performed in parallel, sequentially, or some combination thereof.

Figure 3:
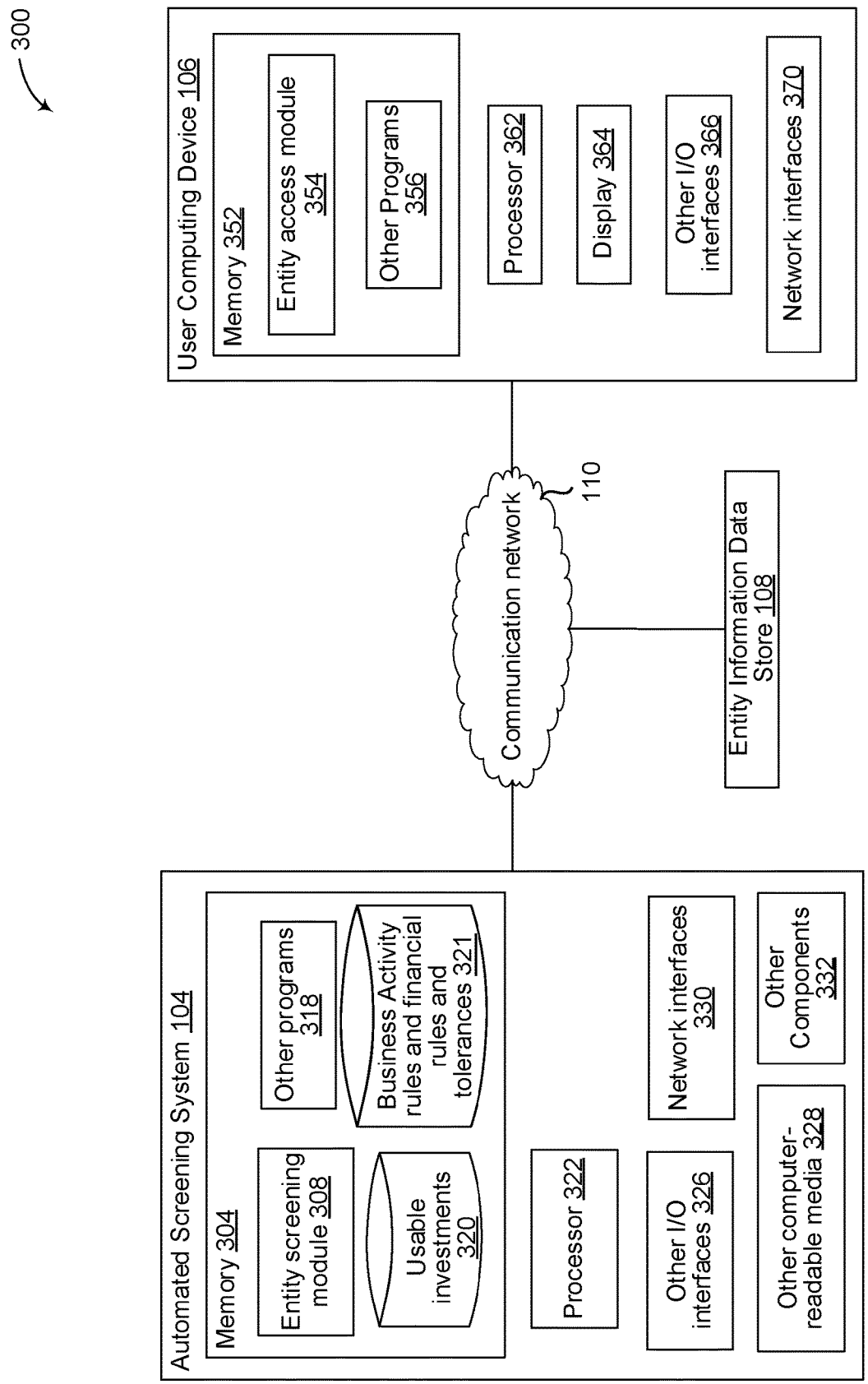
FIG. 3 shows a system diagram that describes one implementation of computing systems for implementing embodiments described herein.

FIG. 3 shows a system diagram that describes one implementation of computing systems for implementing embodiments described herein. System 300 includes automated screening system 104, entity information data store 108, and user computing device 106.

The automated screening system 104 is a computing device that can perform functionality described herein for screening entities in accordance with activity and financial rules. Examples of the automated screening system 104 include, but are not limited to, a server computer, a desktop computer, cloud computing resources, etc.

One or more special-purpose computing systems may be used to implement the automated screening system 104. Accordingly, various embodiments described herein may be implemented in software, hardware, firmware, or in some combination thereof. The automated screening system 104 includes memory 304, one or more processors 322, input/output (I/O) interfaces 326, other computer-readable media 328, network interface 330, and other components 332.

Processor 322 includes one or more processing devices that execute computer instructions to perform actions, including at least some embodiments described herein. In various embodiments, the processor 322 may include one or more central processing units (CPUs), programmable logic, or other processing circuitry.

Memory 304 may include one or more various types of non-volatile and/or volatile storage technologies. Examples of memory 304 include, but are not limited to, flash memory, hard disk drives, optical drives, solid-state drives, various types of random access memory (RAM), various types of read-only memory (ROM), other computer-readable storage media (also referred to as processor-readable storage media), or other memory technologies, or any combination thereof. Memory 304 may be utilized to store information, including computer-readable instructions that are utilized by processor 322 to perform actions, including at least some embodiments described herein.

Memory 304 may have stored thereon various modules and programs, such as entity screening module 308 and other programs 318. The entity screening module 308 provides functionality to receive entity business data and financial data (e.g., from entity information data store 108) for a plurality of entities and screen those entities against business activity rules and financial rules, respectively, as described herein. Other programs 318 may include operating systems, user applications, or other computer programs.

Memory 304 may also store usable investments 320 and business activity rules and financial rules and tolerances 321. Usable investments 320 may store a list of all the investments deemed usable by embodiments described herein. In some embodiments, memory 304 may also store (not illustrated) a list of all investments deemed non-usable by embodiments described herein. Business activity rules and financial rules and tolerances 321 may include a plurality of business activity rules, a plurality of financial rules, and one or more tolerances as set or modified by an administrator or user.

I/O interfaces 326 may include interfaces for various other input or output devices, such as audio interfaces, other video interfaces, USB interfaces, physical buttons, keyboards, or the like.

Other computer-readable media 328 may include other types of stationary or removable computer-readable media, such as removable flash drives, external hard drives, or the like.

Network interfaces 330 are configured to communicate with the entity information data store 108 and other computing devices, such as the user computing device 106, via a communication network 110. Network interfaces 330 include transmitters and receivers (not illustrated) to send and receive data as described herein.

The user computing device 106 is a computing device utilized by a user to access the automated screening system 104. In some embodiments, the user computing device 106 may be optional and may not be included. Examples of the user computing device 106 include, but are not limited to, a smart phone, tablet computer, laptop computer, desktop computer, etc.

One or more special-purpose computing systems may be used to implement the user computing device 106. Accordingly, various embodiments described herein may be implemented in software, hardware, firmware, or in some combination thereof.

Briefly, the user computing device 106 includes a memory 352, a processor 362, a display 364, other I/O interfaces 366, and network interfaces 370. The memory 352 may include one or more various types of non-volatile and/or volatile storage technologies to store information and computer-readable instructions, similar to memory 304. The memory 352 may store entity access module 354 and other programs 356. Entity access module 354 may provide functionality for interacting with the automated screening system 104. In some embodiments, the entity access module 354 sends entity or investment requests and financial tolerances to the automated screening system 104. In response, the automated screening system 104 returns a list of usable investments for activity and financial rule compliant entities. In at least one embodiment, the entity access module 354 performs all of the functionality of entity screening module 308. The memory 352 may also store other data or content, which may include usable investments, business activity rules, financial rules, etc.

Processor 362 includes one or more processing devices that execute computer instructions to perform actions, including at least some embodiments described herein. In various embodiments, the processor 362 may include one or more central processing units (CPUs), programmable logic, or other processing circuitry.

Display 364 is a display device capable of rendering content, such as usable investments, or other graphical user interfaces to a user. The display 364 may be a liquid crystal display, light emitting diode, or other type of display device, and may include a touch sensitive screen capable of receiving inputs from a user's hand, stylus, or other object.

Other I/O interfaces 366 may include interfaces for various other input or output devices, such as audio interfaces, other video interfaces, USB interfaces, physical buttons, keyboards, or the like.

Network interfaces 370 are configured to communicate with the automated screening system 104 via a communication network 110.

Automated screening system 104, user computing device 106, and entity information data store 108 may include additional components, but those components are not illustrated in FIG. 3 for brevity.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

This application claims the benefit of priority to U.S. Provisional Application No. 62/872,579, filed Jul. 10, 2019, which application is hereby incorporated by reference in its entirety.

The invention claimed is:

1. A computing system, comprising:
a memory that stores computer-executable instructions, a plurality of business activity rules, and a plurality of financial rules;
a processor that executes the computer-executable instructions to perform actions, the actions including:
obtaining first and second data for each of a plurality of entities;
screening first data for each respective entity of a plurality of entities by:
determining if the first data for the respective entity complies with the plurality of business activity rules;
adding investments associated with the respective entity to a first list of non-usable investments in response to the respective entity failing to comply with the plurality of business activity rules; and
identifying the respective entity as a business-activity-compliant entity in response to the respective entity complying with the plurality of business activity rules;
screening second data for each respective business-activity-compliant entity by:
receiving at least one tolerance setting for the plurality of financial rules;
defining a plurality of screening methodologies to apply to the second data for the respective business-activity-compliant entity;
for each screening methodology of the plurality of screening methodologies:
determining whether the screening methodology is performed sequentially or in parallel with another screening methodology of the plurality of screening methodologies;
adding the screening methodology to a list of sequential screening methodologies in response to a determination that the screening methodology is performed sequentially with another screening methodology of the plurality of screening methodologies; and
adding the screening methodology to a list of parallel screening methodologies in response to a determination that the screening methodology is performed in parallel with another screening methodology of the plurality of screening methodologies; and
employing each respective screening methodology of the plurality of screening methodologies, wherein the screening methodologies included in the list of parallel screening methodologies are employed in parallel with other screening methodologies and the screening methodologies included in the list of sequential screening methodologies are employed sequentially, by:
applying each of the plurality of financial rules, including the one or more financial rules, to the second data for the respective business-activity-compliant entity in accordance with the respective screening methodology;
determining if the applied financial rules satisfy the at least one tolerance setting;
adding investments associated with the respective business-activity-compliant entity to a second list of usable investments in response to a determination that the applied financial rules satisfy the at least one tolerance setting; and adding the investments associated with the respective business-activity-compliant entity to the first list of non-usable investments in response to a determination that the applied financial rules fail to satisfy the at least one tolerance setting, wherein adding the investments associated with the respective business-activity-compliant entity to the first list of non-usable investments includes:
receiving instructions to modify the at least one tolerance setting for the plurality of financial rules;
re-employing each respective screening methodology of the plurality of screening methodologies by:
applying each of the plurality of financial rules to the second data for the respective business-activity-compliant entity in accordance with the respective screening methodology;
determining if the applied financial rules satisfy the at least one modified tolerance setting;
adding the investments associated with the respective business-activity-compliant entity to the second list of usable investments in response to the applied financial rules satisfying the at least one modified tolerance setting; and
adding the investments associated with the respective business-activity-compliant entity to the first list of non-usable investments in response to the applied financial rules not satisfying the at least one modified tolerance setting; and
providing the second list of usable investments to a user computing device.

2. The computing system of claim 1, wherein first data includes business-related activity data and the second data includes financial data.

3. The computing system of claim 1, wherein adding the investments associated with the respective business-activity-compliant entity to the first list of non-usable investments in response to the applied financial rules failing to satisfy the at least one tolerance setting, includes:
receiving instructions from a review board indicating the respective business-activity-compliant entity is compliant; and
adding the investments associated with the respective business-activity-compliant entity to the second list of usable investments.

4. The computing system of claim 1, wherein obtaining the first and second data includes:
receiving stock market feed data for each of the plurality of entities.

5. The computing system of claim 1, wherein obtaining the first and second data includes:
receiving eXtensible Business Reporting Language (XBRL) format financial data for each of the plurality of entities.

6. The computing system of claim 1, wherein obtaining the first and second data includes:
receiving non-XBRL (eXtensible Business Reporting Language) format financial data for each of the plurality of entities; and
converting the non-XBRL format financial into XBRL format financial data.

7. A method performed by at least one processor of a computing device, the method comprising:
obtaining, by the at least one processor, entity data for each of a plurality of entities and storing the entity data in a memory accessible by the at least one processor;
screening, by the at least one processor, the entity data for each respective entity of a plurality of entities with business activity rules, by:
determining, by the at least one processor, if the entity data for the respective entity complies with the plurality of business activity rules;
adding, by the at least one processor, investments associated with the respective entity to a first list of non-usable investments in response to the respective entity failing to comply with the plurality of business activity rules; and
identifying, by the at least one processor, the respective entity as a business-activity-compliant entity in response to the respective entity complying with the plurality of business activity rules;
screening, by the at least one processor, the entity data for each respective business-activity-compliant entity with financial rules, wherein the screening comprises:
receiving, by the at least one processor, at least one tolerance setting for the plurality of financial rules;
defining, by the at least one processor, a plurality of screening methodologies to apply to the entity data;
for each screening methodology of the plurality of screening methodologies:
determining, by the at least one processor, whether the screening methodology is performed sequentially or in parallel with another screening methodology of the plurality of screening methodologies;
adding, by the at least one processor, the screening methodology to a list of sequential screening methodologies in response to a determination that the screening methodology is performed sequentially with another screening methodology of the plurality of screening methodologies; and
adding, by the at least one processor, the screening methodology to a list of parallel screening methodologies in response to a determination that the screening methodology is performed in parallel with another screening methodology of the plurality of screening methodologies; and
employing, by the at least one processor, each respective screening methodology of the plurality of screening methodologies, wherein the screening methodologies included in the list of parallel screening methodologies are employed in parallel with other screening methodologies and the screening methodologies included in the list of sequential screening methodologies are employed sequentially, by:
applying, by the at least one processor, each of the plurality of financial rules to the entity data for the respective business-activity-compliant entity in accordance with the respective screening methodology;
determining, by the at least one processor, if the applied financial rules satisfy the at least one tolerance setting;
adding, by the at least one processor, investments associated with the respective business-activity-compliant entity to a second list of usable investments in response to determining that the applied financial rules satisfy the at least one tolerance setting; and adding, by the at least one processor, the investments associated with the respective business-activity-compliant entity to the first list of non-usable investments in response to determining that the applied financial rules fail to satisfy the at least one tolerance setting, wherein adding the investments includes:

receiving, by the at least one processor, instructions to modify the at least one tolerance setting for the plurality of financial rules;

re-employing, by the at least one processor, each respective screening methodology of the plurality of screening methodologies by:

applying, by the at least one processor, each of the plurality of financial rules to the entity data for the respective business-activity-compliant entity in accordance with the respective screening methodology;

determining, by the at least one processor, if the applied financial rules satisfy the at least one modified tolerance setting;

adding, by the at least one processor, the investments associated with the respective business-activity-compliant entity to the second list of usable investments in response to the applied financial rules satisfying the at least one modified tolerance setting; and adding, by the at least one processor, the investments associated with the respective business-activity-compliant entity to the first list of non-usable investments in response to the applied financial rules not satisfying the at least one modified tolerance setting; and presenting, by the at least one processor, the second list of usable investments on a user computing device.

8. The method of claim 7, wherein adding the investments associated with the respective business-activity-compliant entity to the first list of non-usable investments in response to the applied financial rules failing to satisfy the at least one tolerance setting, includes:

receiving, by the at least one processor, instructions from a review board indicating the respective business-activity-compliant entity is compliant; and adding, by the at least one processor, the investments associated with the respective business-activity-compliant entity to the second list of usable investments.

9. The method of claim 7, wherein obtaining the entity data for the respective business-activity-compliant entity includes:

receiving, by the at least one processor, stock market feed data for the respective business-activity-compliant entity.

10. The method of claim 7, wherein obtaining the entity data for the respective business-activity-compliant entity includes:

receiving, by the at least one processor, eXtensible Business Reporting Language (XBRL) format financial data for the respective business-activity-compliant entity.

11. The method of claim 7, wherein obtaining the entity data for the respective business-activity-compliant entity includes:

receiving, by the at least one processor, non-XBRL (eXtensible Business Reporting Language) format financial data for the respective business-activity-compliant entity; and converting, by the at least one processor, the non-XBRL format financial into XBRL format financial data.

12. A computer-readable non-transitory storage medium that stores instructions which, when executed by a processor in a computing system, cause the processor to perform actions, the actions comprising:

obtaining entity data for each of a plurality of entities;
screening business-related activities in the entity data for each respective entity of a plurality of entities by:
obtaining a plurality of business activity rules;
determining if the business-related activities for the respective entity complies with the plurality of business activity rules;
adding investments associated with the respective entity to a first list of non-usable investments in response to the respective entity failing to comply with the plurality of business activity rules;
identifying the respective entity as a business-activity-compliant entity in response to the respective entity complying with the plurality of business activity rules;
screening financial activities in the entity data for each respective business-activity-compliant entity by: obtaining data regarding financial rules including a plurality of financial rules;
receiving at least one tolerance setting for the plurality of financial rules;
defining a plurality of screening methodologies to apply to the financial activities;
for each screening methodology of the plurality of screening methodologies:
determining whether the screening methodology is performed sequentially or in parallel with another screening methodology of the plurality of screening methodologies;
adding the screening methodology to a list of sequential screening methodologies in response to a determination that the screening methodology is performed sequentially with another screening methodology of the plurality of screening methodologies; and
adding the screening methodology to a list of parallel screening methodologies in response to a determination that the screening methodology is performed in parallel with another screening methodology of the plurality of screening methodologies; and
employing each respective screening methodology of the plurality of screening methodologies, wherein the screening methodologies included in the list of parallel screening methodologies are employed in parallel with other screening methodologies and the screening methodologies included in the list of sequential screening methodologies are employed sequentially, by:
applying each of the plurality of financial rules to the financial activities for the respective business-activity-compliant entity in accordance with the respective screening methodology;

determining if the applied financial rules satisfy the at least one tolerance setting;

adding investments associated with the respective business-activity-compliant entity to a second list of usable investments in response to a determination that the applied financial rules satisfy the at least one tolerance setting; and adding the investments associated with the respective business-activity-compliant entity to the first list of non-usable investments in response to a determination that the applied financial rules fail to satisfy the at least one tolerance setting, wherein adding the investments includes:

receiving instructions to modify the at least one tolerance setting for the plurality of financial rules;

re-employing each respective screening methodology of the plurality of screening methodologies by:

applying each of the plurality of financial rules to the financial activities for the respective business-activity-compliant entity in accordance with the respective screening methodology;

determining if the applied financial rules satisfy the at least one modified tolerance setting;

adding the investments associated with the respective business-activity-compliant entity to the second list of usable investments in response to the applied financial rules satisfying the at least one modified tolerance setting; and adding the investments associated with the respective business-activity-compliant entity to the first list of non-usable investments in response to the applied financial rules not satisfying the at least one modified tolerance setting; and providing the second list of usable investments to a user computing device.

13. The computer-readable non-transitory storage medium of claim 12, wherein execution of the instructions by the processor to add the investments associated with the respective business-activity-compliant entity to the first list of non-usable investments in response to the applied financial rules failing to satisfy the at least one tolerance setting cause the processor to perform further actions, the further actions comprising:

receiving instructions from a review board indicating the respective business-activity-compliant entity is compliant; and adding the investments associated with the respective business-activity-compliant entity to the second list of usable investments.

14. The computer-readable non-transitory storage medium of claim 12, wherein execution of the instructions by the processor to obtain the entity data for the respective business-activity-compliant entity cause the processor to perform further actions, the further actions comprising:

receiving stock market feed data for the respective business-activity-compliant entity.

15. The computer-readable non-transitory storage medium of claim 12, wherein execution of the instructions by the processor to obtain the entity data for the respective business-activity-compliant entity cause the processor to perform further actions, the further actions comprising:

receiving eXtensible Business Reporting Language (XBRL) format financial data for the respective business-activity-compliant entity.

16. The computer-readable non-transitory storage medium of claim 12, wherein execution by the processor to obtain the entity data for the respective business-activity-compliant entity cause the processor to perform further actions, the further actions comprising:

receiving non-XBRL (eXtensible Business Reporting Language) format financial data for the respective business-activity-compliant entity; and converting the non-XBRL format financial into XBRL format financial data.

17. The method of claim 7, wherein the entity data includes business-related activity data and financial data.

18. The computer-readable non-transitory storage medium of claim 12, wherein the entity data includes business-related activity data and financial data.

* * * * *